J. T. BROOKS & J. F. MORELL.
Shade-Fixtures.
No. 168,713.
Patented Oct. 11, 1875.
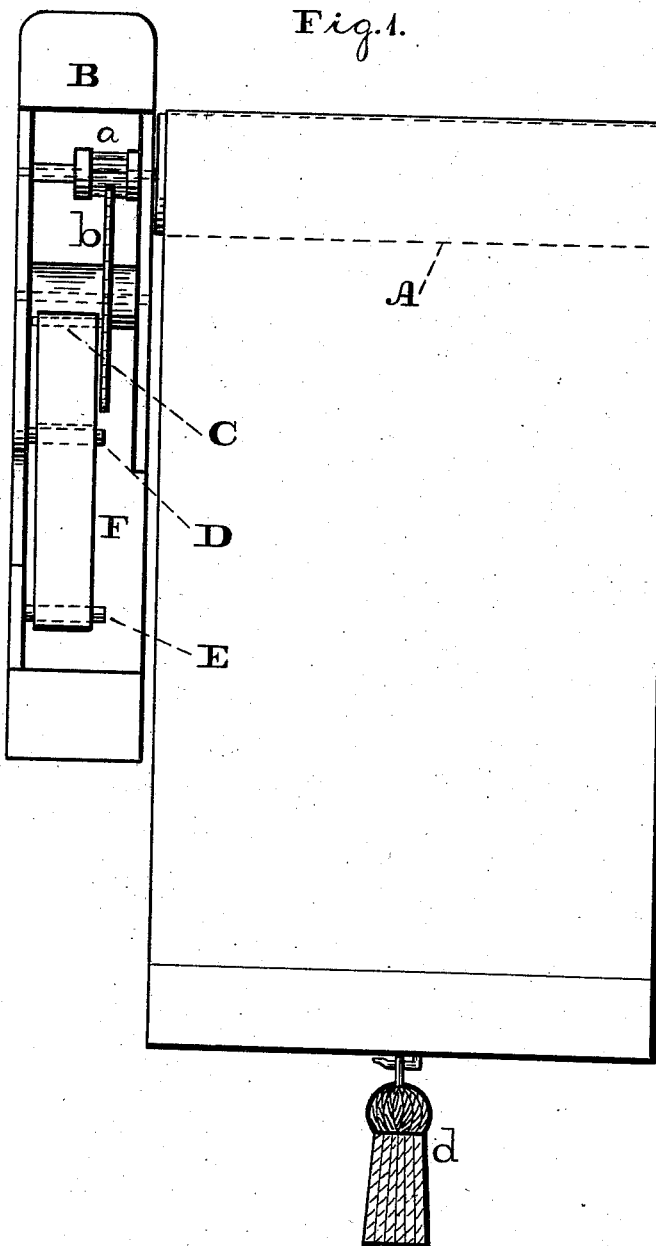
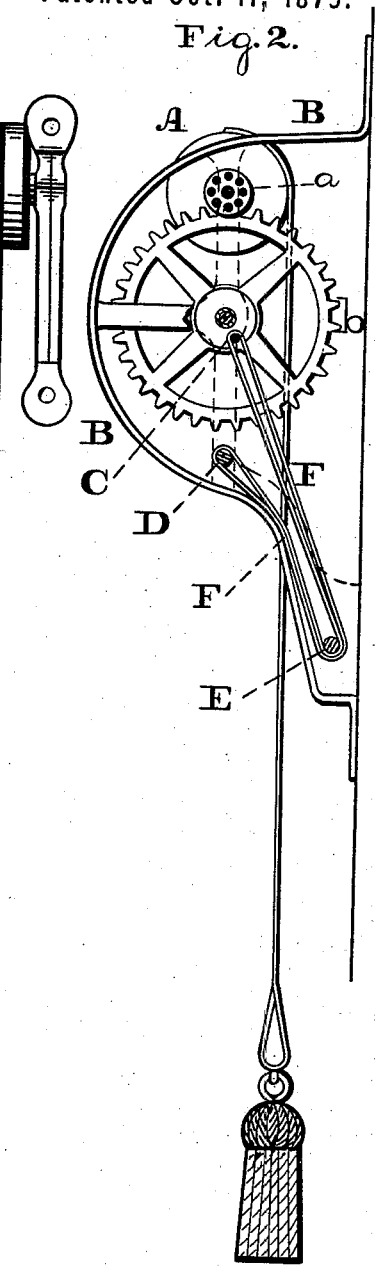
Witnesses:
Lewis F. Brous
A. P. Grant.
Inventor:
John T. Brooks.
James F. Morell.

UNITED STATES PATENT OFFICE.

JOHN T. BROOKS, OF BERLIN, AND JAMES F. MORELL, OF TUCKAHOE, N. J.

IMPROVEMENT IN SHADE-FIXTURES.

Specification forming part of Letters Patent No. 168,713, dated October 11, 1875; application filed August 30, 1875.

*To all whom it may concern:*

Be it known that we, JOHN T. BROOKS, of Berlin, in the county of Camden, and JAMES F. MORELL, of Tuckahoe, in the county of Cape May, both in the State of New Jersey, have invented a new and useful Improvement in Shade-Fixtures; and we do hereby declare the following to be a clear and exact description of the nature thereof, sufficient to enable others skilled in the art to which our invention appertains to fully understand, make, and use the same, reference being had to the accompanying drawings making part of this specification, in which—

Figure 1 is a rear view of the device embodying our invention. Fig. 2 is a side view thereof.

Similar letters of reference indicate corresponding parts in the two figures.

My invention consists of a self-winding shade, whose roller receives power from a piece of soft rubber, whereby the shade may be wound in either direction, and the rubber conveniently applied and removed as occasion requires.

For this purpose we employ a spring, consisting of an endless rubber band, and slip one portion of it over a pin projecting from a wheel which gears with the pintle of the roller, and slip the opposite portion over a pin projecting from or about the bottom of the bracket, the arrangement of parts being such that the band may be easily attached and removed, and all parts are immediately connected to the bracket without employment of cords and buttons, or knobs attached to the window-frame.

Referring to the drawings, A represents a shade-roller, to the pintle of one end of which is connected a pinion, *a*, which gears with a large toothed wheel, *b*, whose bearings are on a bracket, B, which is secured to the frame of the window, sash, door, or other place of application of the shade. Projecting laterally outward from the hub of the wheel *b* is a pin or stud, C, and projecting laterally inward from the bracket B is a pin or stud, D. From near the bottom of the bracket there projects laterally a pin or stud, E, the several pins or studs having each one end free. F represents an endless soft-rubber band, which, at a certain point of its length, is slipped on the pin C, and at a point opposite thereto on the pin D, and said band, in extending from one pin to the other, passes around the bottom pin E, whereby what may be termed the ends of the band are properly separated, and suitable tension will be imparted to the band.

The principle of a self-winding shade is well known.

When the band F is wound on the axis of the wheel *b*, its tension may be utilized to rotate said wheel, and consequently the roller A, whereby by properly primarily winding the shade the latter may be automatically wound up, the power of the spring being counterbalanced by a weight or weighted tassel, *d*.

When the band breaks or wears out a new one can be readily applied by slipping it on the two pins C D, and passing it around the pin E, this being accomplished by the least experienced person, no special expertness being required therefor.

We are aware that a cord is made to wind on the spool of the roller, and pass around a friction-button or knob at the bottom of the window-frame to a spring secured to the upper end of the frame; but our invention is different in that the rubber spring itself winds and unwinds, and all parts are immediately connected to the bracket, thus dispensing with the cord and friction-knob, and avoiding appliances below the bracket.

Having thus described our invention, what we claim as new, and desire to secure by Letters Patent, is—

The combination, with the shade-roller bracket B, provided with the projecting pins D E, and the wheel *b*, provided with the projecting pin C, and gearing with the pinion *a*, of the endless rubber band F, all constructed and operated substantially in the manner and for the purpose herein set forth.

JNO. T. BROOKS.
JAS. F. MORELL.

Witnesses:
JOHN A. WIEDERSHEIM,
ALBERT H. HOECKLEY.